(12) United States Patent
Haynes et al.

(10) Patent No.: US 9,595,009 B2
(45) Date of Patent: Mar. 14, 2017

(54) CODE REVIEWER SELECTION IN A DISTRIBUTED SOFTWARE DEVELOPMENT ENVIRONMENT

(75) Inventors: Thomas R. Haynes, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 13/171,488

(22) Filed: Jun. 29, 2011

(65) Prior Publication Data

US 2013/0007704 A1    Jan. 3, 2013

(51) Int. Cl.
G06F 9/44 (2006.01)
G06Q 10/00 (2012.01)

(52) U.S. Cl.
CPC .................................... G06Q 10/00 (2013.01)

(58) Field of Classification Search
None
See application file for complete search history.

(56) References Cited

U.S. PATENT DOCUMENTS

| | | | |
|---|---|---|---|
| 7,174,348 B1 * | 2/2007 | Sadhu | G06F 8/71 |
| 7,904,802 B1 * | 3/2011 | Kolawa | G06Q 10/06 |
| | | | 705/300 |
| 2003/0163807 A1 * | 8/2003 | Drake | G06F 8/61 |
| | | | 717/174 |
| 2007/0027707 A1 * | 2/2007 | Murray | G06Q 10/063 |
| | | | 705/7.11 |
| 2008/0040355 A1 * | 2/2008 | Martinez | G06F 17/30699 |
| 2008/0263518 A1 * | 10/2008 | Bank | G06F 8/33 |
| | | | 717/120 |
| 2008/0295085 A1 * | 11/2008 | Rachamadugu | G06F 8/75 |
| | | | 717/159 |
| 2008/0301661 A1 * | 12/2008 | Haynes | G06F 8/65 |
| | | | 717/170 |
| 2009/0094086 A1 * | 4/2009 | Bruno | G06Q 10/06311 |
| | | | 705/7.13 |
| 2009/0094580 A1 * | 4/2009 | Bank | G06F 8/73 |
| | | | 717/123 |
| 2009/0119258 A1 * | 5/2009 | Petty | G06Q 30/02 |
| 2009/0282388 A1 * | 11/2009 | Gawor | G06F 8/20 |
| | | | 717/120 |

(Continued)

*Primary Examiner* — Wei Zhen
*Assistant Examiner* — Hossain Morshed
(74) *Attorney, Agent, or Firm* — Steven M. Greenberg, Esq.; CRGO Law

(57) ABSTRACT

Embodiments of the present provide a method, system and computer program product for reviewer selection during distributed software development. In an embodiment of the invention, a method for reviewer selection during distributed software development can include receiving a request to review a module of source code stored in a source code repository and managed by an IDE executing in memory of a computer. The method also can include retrieving meta-data for the module of source code referencing different collaborators previously accessing the module of source code in the IDE. The method yet further can include ranking the collaborators according to at least one user centric characteristic of the module of source code. Finally, the method can include selecting a highest ranked one of the collaborators to review the module of source code.

21 Claims, 1 Drawing Sheet

(56) References Cited

U.S. PATENT DOCUMENTS

2010/0030626 A1* 2/2010 Hughes .............. G06Q 30/0208
717/128
2012/0150851 A1* 6/2012 Agrawal ........... G06F 17/30707
707/728

* cited by examiner

CODE REVIEWER SELECTION IN A DISTRIBUTED SOFTWARE DEVELOPMENT ENVIRONMENT

BACKGROUND OF THE INVENTION

Field of the Invention

The present invention relates to the field of software development and more particularly to distributed software development.

Description of the Related Art

Software development historically involved the coding of source code in what amounted to little more than a text editor with some enhanced functions particular to coding. Over time, the complexity of software development resulted in the development of the integrated development environment (IDE). In an IDE, a text editor in which code can be edited directly can be combined with both development time tools such as module management, and debugging tools such as trace and watch functions and various inspectors. Until recently, however, the IDE had been intended for use by a single user in the development of a multi-module project. In the past decade or so, however, the globalization of the economy has resulted in distributed coding efforts.

In a distributed coding effort, software developers that are geographically dispersed collaborate in the coding, debugging, testing and deployment of software. To facilitate the global effort, the IDE has incorporated concepts in document management such as revision control, change management and merging, and check-in/check-out in order to provide a central platform for coordinating the development of software. Yet, the modern IDE while automating much still does not account in an automated way for much of the best practices accorded to software development—particularly quality control and code review.

In this regard, In today's highly dynamic working environment, it is common for developers/testers to work with other developers and testers all over the world when delivering software products. Further, it is common for developers to develop multiple components. As such, at any given time, the focus of software development may shift from one component to another component or yet a further component depending upon business needs. When working with a large team, developers may never meet with any of the remote developers and may not know the respective expertise of remotely disposed developments contributing to the project. Whenever it comes to the time to choose a reviewer or approver or an owner of a particularly software development task, developers may be unsure about the correct person to chose as a reviewer.

BRIEF SUMMARY OF THE INVENTION

Embodiments of the present invention address deficiencies of the art in respect to distributed software development and provide a novel and non-obvious method, system and computer program product for reviewer selection during distributed software development. In an embodiment of the invention, a method for reviewer selection during distributed software development can include receiving a request to review a module of source code stored in a source code repository and managed by an IDE executing in memory of a computer. The method also can include retrieving meta-data for the module of source code referencing different collaborators previously accessing the module of source code in the IDE. The method yet further can include ranking the collaborators according to at least one user centric characteristic of the module of source code. Finally, the method can include selecting a highest ranked one of the collaborators to review the module of source code.

In an aspect of the embodiment, the user centric characteristics of the module of source code can include a collaborator who most recently accessed the module of source code. In another aspect of the embodiment, the user centric characteristics of the module of source code can include a collaborator who most frequently has accessed the module of source code. In yet another aspect of the embodiment, the user centric characteristics of the module of source code can include a collaborator who created the module of source code. In even yet another aspect of the embodiment, the user centric characteristics of the module of source code can include a collaborator who has accessed the source code for a greatest duration of time.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for reviewer selection during distributed software development. In accordance with an embodiment of the invention, source code in a software development project can be selected for review through a GUI to an IDE. Meta-data pertaining to collaborative end users associated with the source code can be retrieved and one or more reviewer selection rules applied to the meta-data in order to identify a candidate to review the source code. Optionally, an availability of the candidate can be considered before selecting the candidate. Thereafter, a request can be routed to the candidate over a computer communications network to perform a review of the source code. In this way, a reviewer most likely to be relevant to the review of the source code can be selected despite the geographic dispersion of the collaborators in the software development project.

Figure 1:
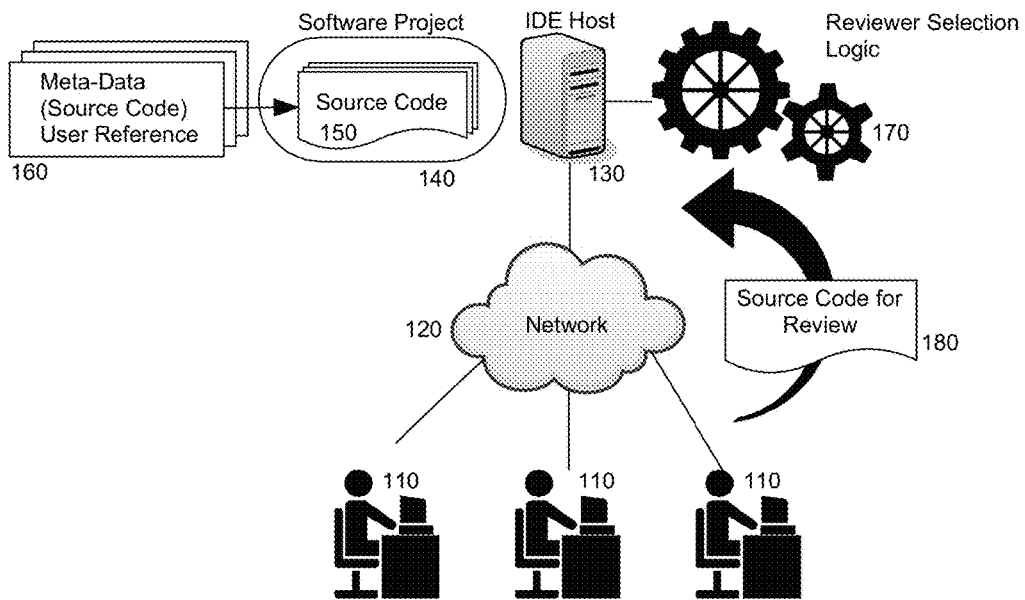
FIG. 1 is a pictorial illustration of a process for reviewer selection during distributed software development.

In further illustration, FIG. 1 pictorially shows a process for reviewer selection during distributed software development. As shown in FIG. 1, different collaborators 110 in a distributed software development environment can access an IDE 130 over a computer communications network 120 in order to collaboratively create, modify and test source code 150 in a software development project 140. Each module of source code 150 can include corresponding meta-data 160 specifying amongst the collaborators 110 the person who initially created the module of source code 150, those who have modified the module of source code 150, and optionally, the frequency, timing and duration of access of the module of source code 150 by different ones of the collaborators 110.

Reviewer selection logic 170 can process a request to review source code 180 provided by one of the collaborators 110 by inspecting corresponding meta data 160 to determine one or more of the collaborators 110 most suited to perform the review. In this regard, different reviewer selection rules (not shown) can be applied to the corresponding meta data 160 such as identifying one of the collaborators 110 most recently accessed the source code 180, one of the collaborators 110 most frequently has accessed the source code 180, one of the collaborators 110 created the source code 180, or one of the collaborators 110 accessed the source code 180 for the greatest duration. Optionally, the rules can be individually weighted and an aggregate ranking applied to the collaborators 110.

Thereafter, a request for review can be provided to highest ranking one of the collaborators 110 along with a reference to the source code 180. Optionally, to the extent that the requested review is considered to be urgent, the reviewer selection logic 170 can remove from consideration those of the collaborators 110 unlikely to perform the review with urgency due to time zone differences. For instance, a selection of a reviewing one of the collaborators in the Far East for an urgent review of the source code 180 requested by a requesting one of the collaborators 110 in Europe would be inappropriate if the request occurs at nighttime in Europe. Additionally, the ability of the selected one of the collaborators 110 to review the source code can be considered by inspecting a calendar or task list of the selected one of the collaborators 110 to infer when the selected one of the collaborators is too busy to perform the requested review of the source code 180.

Figure 2:
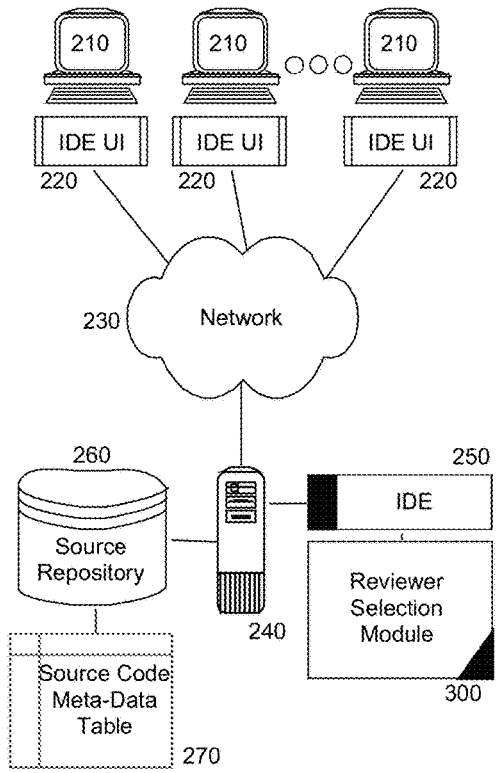
FIG. 2 is a schematic illustration of a distributed development data processing system configured for reviewer selection; and, FIG. 3 is a flow chart illustrating a process for reviewer selection during distributed software development.

The process described in connection with FIG. 1 can be implemented in a data processing system. In yet further illustration, FIG. 2 schematically shows a distributed development data processing system configured for reviewer selection. The system can include a host server 240 with at least one processor and memory supporting the execution of an IDE 250. The IDE 250 can provide a development environment in which different modules of source code stored in source repository 260 can be created, updated and debugged by different end users at respectively different client computers 210 over computer communications network 230, each of the client computers 210 providing a UI 220 to the IDE 250. Of note, a reviewer selection module 300 can be coupled to the IDE 250.

The reviewer selection module 300 can include program code that when executed in the memory of the host server 240 can be enabled to process a request to review a module of source code (such as a single source code file or a single unit of source code like a class) by referring to meta data for the module of source code in source code meta data table 270 to identify user centric characteristics of the module of source code such as the user who most recently accessed the module of source code, the user who most frequently has accessed the module of source code, the user who created the module of source code, or the user who has accessed the source code for the greatest duration of time.

The program code of the reviewer selection module 300 additionally can be enabled to apply one or more weighted rules (not shown) the user centric characteristics of the module to rank each referenced user in the meta data. The highest ranked referenced user can be selected to review the module of source code, however, to the extent the highest ranked referenced user is determined to be unlikely to be able to perform the requested review, a next highest ranked referenced user can be selected to review the module of source code. Yet further, to the extent the review is considered urgent, the highest ranked referenced user in temporal proximity to the requesting user can be selected as preferential over a referenced user disposed remotely across one or more time zones so as to render the completion of a timely review of the module of source code less likely.

Figure 3:
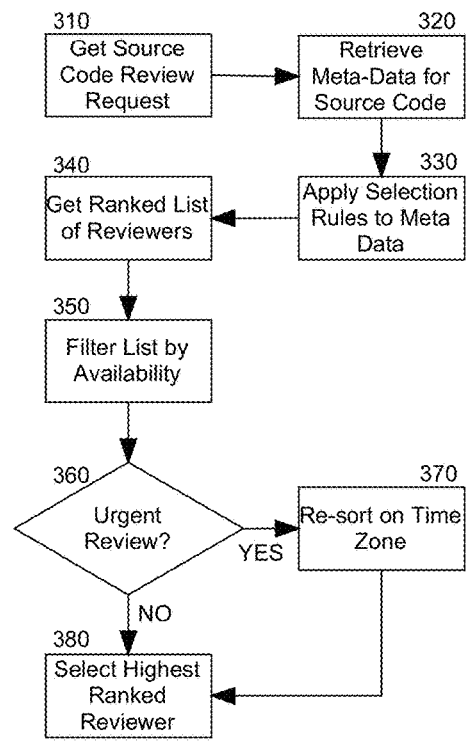

In even yet further illustration of the operation of the reviewer selection module 300, FIG. 3 is a flow chart illustrating a process for reviewer selection during distributed software development. Beginning in block 310, a source code review request can be received. In block 320, meta-data for the source code can be retrieved associating the source code with different collaborators. In block 330, one or more selection rules can be applied to the meta-data, such as a preference for collaborators such as the collaborator who most recently accessed the source code, the collaborator who most frequently has accessed the source code, the collaborator who created the source code, or the collaborator who has accessed the source code for the greatest duration of time. Optionally, the rules can be weighted and a composite score determined for each of the collaborators based upon a combination of the application of the different rules.

Thereafter, in block 340, a list of collaborators in rank order can be created as potential reviewers of the source code. In block 350, the list can be filtered according to the availability of each of the reviewers. In particular, in reference to the calendar or task list of each of the reviewers in the list, reviewers assigned to perform a time consuming task or reviewers scheduled to be absent or busy in meetings can be excluded from the list. In decision block 360, it can be determined if the requested review is urgent. If so, in block 370 the list of reviewers can be sorted according to the time zone of reviewers relative to the requesting collaborator. Finally, in block 380, a highest ranking reviewer can be selected to review the source code and can be notified electronically accordingly.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for reviewer selection during distributed software development, the method comprising:
   receiving a request from a requestor to review a module of source code stored in a source code repository and managed by an integrated development environment (IDE) executing in memory of a computer;
   retrieving meta-data for the module of source code referencing different collaborators previously accessing the module of source code in the IDE;
   applying selection rules to the meta-data in order to select ones of the different collaborators;
   ranking the selected ones of the different collaborators in a list according to at least one user centric characteristic of the module of source code and filtering the ranked list according to availability of each of the selected ones of the different collaborators in the list;
   determining if an urgent review of the source code is requested; and,
   selecting a highest ranked one of the collaborators in the ranked and filtered list to review the module of source code in response to a determination that no urgent review is requested, but otherwise re-sorting the ranked and filtered list based upon time zone and selecting a highest ranked one of the collaborators in a nearest time zone to the requestor as a reviewer of the source code.

2. The method of claim 1, wherein the user centric characteristics of the module of source code comprise a collaborator who most recently accessed the module of source code.

3. The method of claim 1, wherein the user centric characteristics of the module of source code comprise a collaborator who most frequently has accessed the module of source code.

4. The method of claim 1, wherein the user centric characteristics of the module of source code comprise a collaborator who created the module of source code.

5. The method of claim 1, wherein the user centric characteristics of the module of source code comprise a collaborator who has accessed the source code for a greatest duration of time.

6. The method of claim 1, further comprising omitting from consideration as a reviewer a collaborator determined to be too busy to perform the review based upon an inspection of a calendar or task list of the collaborator determined to be too busy.

7. The method of claim 1, further comprising omitting from consideration as a reviewer a collaborator in a time zone distant from a time zone of a requestor of the review of the source code module.

8. A distributed software development data processing system comprising:
   a host server comprising memory and at least one processor;
   an integrated development environment (IDE) executing in the memory of the host server; and,
   a reviewer selection module coupled to the IDE and comprising program code executing in the memory of the host server, the program code receiving a request from a requestor to review a module of source code in the IDE, retrieving meta-data for the module of source code referencing different collaborators previously accessing the module of source code in the IDE, applying selection rules to the meta-data in order to select ones of the different collaborators, ranking the selected ones of the different collaborators in a list according to at least one user centric characteristic of the module of source code, determining if an urgent review of the source code is requested and filtering the ranked list according to availability of each of the selected ones of the different collaborators in the list, determining if an urgent review of the source code is requested, and selecting a highest ranked one of the collaborators in the ranked and filtered list to review the module of source code in response to a determination that no urgent review is requested, but otherwise re-sorting the ranked and filtered list based upon time zone and selecting a highest ranked one of the collaborators in a nearest time zone to the requestor as a reviewer of the source code.

9. The system of claim 8, wherein the user centric characteristics of the module of source code comprise a collaborator who most recently accessed the module of source code.

10. The system of claim 8, wherein the user centric characteristics of the module of source code comprise a collaborator who most frequently has accessed the module of source code.

11. The system of claim 8, wherein the user centric characteristics of the module of source code comprise a collaborator who created the module of source code.

12. The system of claim 8, wherein the user centric characteristics of the module of source code comprise a collaborator who has accessed the source code for a greatest duration of time.

13. The system of claim 8, the program code omitting from consideration as a reviewer a collaborator determined to be too busy to perform the review based upon an inspection of a calendar or task list of the collaborator determined to be too busy.

14. The system of claim 8, omitting from consideration as a reviewer a collaborator in a time zone distant from a time zone of a requestor of the review of the source code module.

15. A computer program product for reviewer selection during distributed software development, the computer program product comprising:
   a non-transitory computer readable storage device having computer readable program code embodied therewith, the computer readable program code comprising:
   computer readable program code for receiving a request from requestor to review a module of source code stored in a source code repository and managed by an integrated development environment (IDE) executing in memory of a computer;
   computer readable program code for retrieving meta-data for the module of source code referencing different collaborators previously accessing the module of source code in the IDE;
   computer readable program code for applying selection rules to the meta-data in order to select ones of the different collaborators;
   computer readable program code for ranking the selected ones of the different collaborators in a list according to at least one user centric characteristic of the module of source code and filtering the ranked list according to availability of each of the selected ones of the different collaborators in the list;
   computer readable program code for determining if an urgent review of the source code is requested; and,
   computer readable program code for selecting a highest ranked one of the collaborators in the ranked and filtered list to review the module of source code in response to a determination that no urgent review is requested, but otherwise re-sorting the ranked and filtered list based upon time zone and selecting a highest ranked one of the collaborators in a nearest time zone to the requestor as a reviewer of the source code.

16. The computer program product of claim 15, wherein the user centric characteristics of the module of source code comprise a collaborator who most recently accessed the module of source code.

17. The computer program product of claim 15, wherein the user centric characteristics of the module of source code comprise a collaborator who most frequently has accessed the module of source code.

18. The computer program product of claim 15, wherein the user centric characteristics of the module of source code comprise a collaborator who created the module of source code.

19. The computer program product of claim 15, wherein the user centric characteristics of the module of source code comprise a collaborator who has accessed the source code for a greatest duration of time.

20. The computer program product of claim 15, further comprising computer readable program code for omitting from consideration as a reviewer a collaborator determined to be too busy to perform the review based upon an inspection of a calendar or task list of the collaborator determined to be too busy.

21. The computer program product of claim 15, further comprising computer readable program code for omitting from consideration as a reviewer a collaborator in a time zone distant from a time zone of a requestor of the review of the source code module.

\* \* \* \* \*